No. 868,442. PATENTED OCT. 15, 1907.
J. C. JEPSON.
PAINT OR COATING COMPOSITION.
APPLICATION FILED SEPT. 14, 1905.
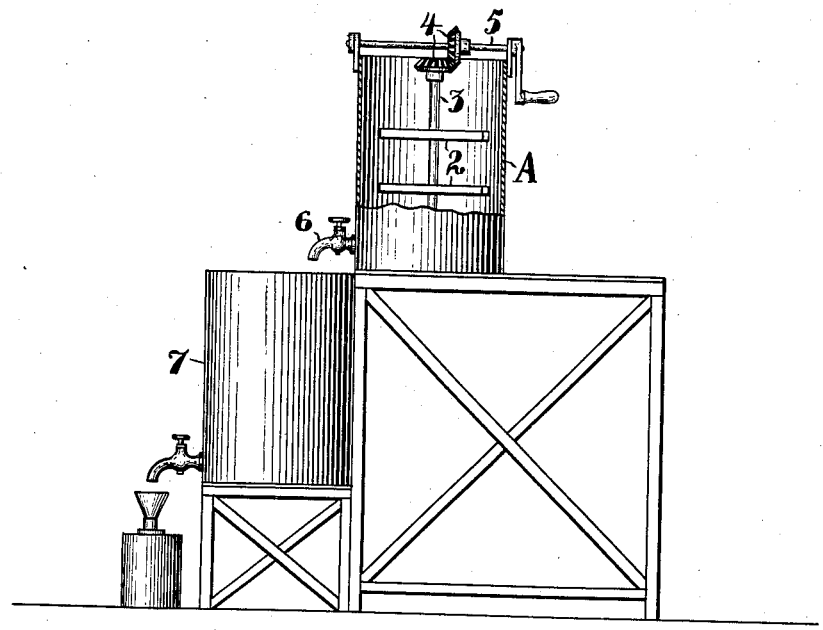
Witnesses:— Inventor,

UNITED STATES PATENT OFFICE.

JOSEPH C. JEPSON, OF SAN FRANCISCO, CALIFORNIA, ASSIGNOR OF ONE-HALF TO EDWARD K. TAYLOR, OF ALAMEDA, CALIFORNIA.

PAINT OR COATING COMPOSITION.

No. 868,442.  Specification of Letters Patent.  Patented Oct. 15, 1907.

Application filed September 14, 1905. Serial No. 278,391.

*To all whom it may concern:*

Be it known that I, JOSEPH C. JEPSON, a citizen of the United States, residing at the city and county of San Francisco and State of California, have invented new and useful Improvements in Paint or Coating Composition, of which the following is a specification.

My invention relates to a material which is designed for coating steel, iron, tin, brick and other surfaces, and for the protection of such surfaces from the effects of the elements.

It consists in the combination of substances and in the separation of the active portion of such compounds from the inert material, said active portion being retained in a liquid form and in condition for use.

In the preparation of my compound I take Portland cement of good quality and mix it with a serous fluid, agitating the same thoroughly, and allowing the inert portion to settle to the bottom. The other part is then drawn off and may be preserved in containing receptacles ready for use.

The accompanying drawing illustrates a form of apparatus by which my compound may be produced.

In the manufacture of the compound I first take Portland cement, calcine and pulverize it. It is then mixed with a proportion of a serous liquid, such as whey or equivalent fluid, and the mixture is made sufficiently thin so that it can be properly agitated. The mixture is placed in a vessel, as at A, with any suitable means for agitating it, such as arms or stirrers as at 2 mounted upon a vertical shaft 3, having driving gears as at 4 and a motor shaft 5 upon which one of said gears is mounted with suitable connections, either a crank or pulley, by which the stirrers 2 may be revolved. After agitating the mass a sufficient length of time the valuable portion will have been taken up by the serous fluid and the inert matter will have settled to the bottom of the chamber A, after the agitation ceases. After the separation has been sufficiently effected the thinner mixture which lies upon the top of the inert mass may be drawn off by means of a cock or faucet as at 6 and received into a second chamber 7 where it may be again allowed to settle, and a small further separation takes place. The liquid may then be drawn off into cans or receptacles in which it is contained and ready for use.

This material is found to be very valuable for the coating of all sorts of metal, for brick walls, for coating piles and generally such surfaces as it is desirable to protect from the action of the elements. Iron or metal coated with this material will not rust or scale. The material dries hard in a short time and is waterproof, will not scale or flake and generally, serves as an efficient protection for the surfaces to which it is applied. It can be applied with a brush.

Having thus described my invention, what I claim and desire to secure by Letters Patent is—

A paint or coating composition consisting of the separated fluid constituents obtained from a mixture of calcined and pulverized cement and whey first intimately mixed and then allowed to settle to separate the fluid from the heavier inert matter.

In testimony whereof I have hereunto set my hand in presence of two subscribing witnesses.

JOSEPH C. JEPSON.

Witnesses:
 GEO. H. STRONG,
 S. H. NOURSE.